United States Patent
Yin et al.

(10) Patent No.: US 12,492,525 B2
(45) Date of Patent: Dec. 9, 2025

(54) EXPERIMENT DEVICE FOR SPUDCAN PENETRATION AND PULLOUT OF JACK-UP RIG

(71) Applicant: China University of Petroleum-Beijing, Beijing (CN)

(72) Inventors: Qishuai Yin, Beijing (CN); Jin Yang, Beijing (CN); Dongsheng Xu, Beijing (CN); Chao Fu, Beijing (CN); Bo Wei, Tianjin (CN)

(73) Assignee: China University of Petroleum-Beijing, Beijing (CN)

( * ) Notice: Subject to any disclaimer, the term of this patent is extended or adjusted under 35 U.S.C. 154(b) by 1116 days.

(21) Appl. No.: 17/410,219

(22) Filed: Aug. 24, 2021

(65) Prior Publication Data

US 2023/0028246 A1    Jan. 26, 2023

(30) Foreign Application Priority Data

Jul. 26, 2021 (CN) .......................... 202110843904.0

(51) Int. Cl.
  *E02B 17/08* (2006.01)
  *G09B 25/02* (2006.01)
  *E02B 17/00* (2006.01)

(52) U.S. Cl.
  CPC .......... *E02B 17/0809* (2013.01); *G09B 25/02* (2013.01); *E02B 2017/0082* (2013.01)

(58) Field of Classification Search
  CPC ......... E02B 17/0809; E02B 2017/0082; E02B 17/021; G09B 25/02; E02D 33/00
  (Continued)

(56) References Cited

U.S. PATENT DOCUMENTS

| 3,797,256 A  * | 3/1974 | Giblon ................ B63B 35/4413 |
| | | 405/196 |
| 2010/0050764 A1* | 3/2010 | Foo ..................... E02B 17/0818 |
| | | 73/170.32 |
| 2015/0225257 A1* | 8/2015 | Inoue ..................... C02F 1/325 |
| | | 210/143 |

FOREIGN PATENT DOCUMENTS

| CN | 101259905 A | 9/2008 |
| CN | 105862937 A | 8/2016 |
| CN | 207622925 U | 7/2018 |

OTHER PUBLICATIONS

Chinese Office Action for Application No. 202110843904.0, dated Apr. 11, 2022, with English translation, 9 pgs.
(Continued)

*Primary Examiner* — Peter S Vasat
*Assistant Examiner* — Stephen Alvesteffer
(74) *Attorney, Agent, or Firm* — Young Basile Hanlon & MacFarlane, P.C.

(57) ABSTRACT

This disclosure provides an experiment device for spudcan penetration and pullout of a jack-up rig, comprising an experiment bench and a spudcan leg, and further comprising: a ballasting tank; supporting wheels provided on the experiment bench; a suspension rope wound around the supporting wheels with two ends being connected respectively to the spudcan leg and the ballasting tank, wherein the ballasting tank has a first state of being seated on the spudcan leg and a second state of being separated from the spudcan leg and suspended under the suspension rope, by configuring the ballasting tank to have two different states, the gravity of the ballasting tank can be used as both the penetration force and the pullout force, and eliminating the need to provide two loading devices to apply the penetration pressure and the pullout force respectively.

10 Claims, 3 Drawing Sheets

(58) Field of Classification Search
USPC .......................................................... 434/365
See application file for complete search history.

(56) References Cited

OTHER PUBLICATIONS

Qishuai Yin, et al., Field experimental investigation of punch-through for different operational conditions during the jack-up rig spudcan penetration in sand overlying clay, Journal of Petroleum Science and Engineering, 195, 2020, 107823.
Oil Drilling Machinery Newsletter, Offshore Oil Research Institute of Ocean Exploration Headquarters, Offshore pile pulling test, 19761031.
Chinese Office Action for Application No. 202110843904.0, dated Jan. 21, 2022, with English translation, 14 pgs.
Chinese Search Report for Application No. 202110843904.0, dated Jan. 21, 2022, with English translation, 5 pgs.

\* cited by examiner

EXPERIMENT DEVICE FOR SPUDCAN PENETRATION AND PULLOUT OF JACK-UP RIG

CROSS-REFERENCE TO RELATED APPLICATIONS

This application claims priority to Chinese Patent Application No. 202110843904.0, filed on Jul. 26, 2021, which is hereby incorporated by reference in its entirety.

TECHNICAL FIELD

This disclosure relates to the technical field of offshore oil exploration, in particular to an experiment device for spudcan penetration and pullout of a jack-up rig.

BACKGROUND

The jack-up rig is a commonly used production equipment in the development of offshore petroleum resources. The jack-up rig is supported in operation by the spudcan legs inserted into the seabed, thus spudcan penetration and pullout operations are required during the development of offshore petroleum resources. In experimental study of spudcan penetration and pullout operations, the conventional approach is to apply penetration force by a ballasting tank to simulate the spudcan penetration process, and apply pullout force by a crane to simulate the spudcan pullout process. Therefore, the experiment device needs to be equipped with a ballasting tank and a crane, leaving the experiment device complex in structure.

SUMMARY

An objective of this disclosure is to provide an experiment device for spudcan penetration and pullout of a jack-up rig, so as to solve the problem of complex structure of the existing experiment devices.

To achieve the above objective, this disclosure provides an experiment device for spudcan penetration and pullout of a jack-up rig, comprising an experiment bench and a spudcan leg, and further comprising: a ballasting tank; supporting wheels provided on the experiment bench; a suspension rope wound around the supporting wheels with two ends being connected respectively to the spudcan leg and the ballasting tank, wherein the ballasting tank has a first state of being seated on the spudcan leg and a second state of being separated from the spudcan leg and suspended under the suspension rope, when the ballasting tank is in the first state, the gravity of the ballasting tank acts as an penetration force exerting on the spudcan leg, and when the ballasting tank is in the second state, the gravity of the ballasting tank acts as a pullout force exerting on the spudcan leg through the suspension rope.

The experiment device for spudcan penetration and pullout of a jack-up rig provided in this disclosure is featured in that:

First of all, in this disclosure, by configuring the ballasting tank to have two different states, the gravity of the ballasting tank can be used as both the penetration force and the pullout force, eliminating the need to provide two loading devices to apply the penetration force and the pullout force respectively. In this way, the structure of the experiment device is simplified, and the experiment process is made simple and the experiment operation is made convenient.

Secondly, in this disclosure, by providing a ballasting tank with a water-containing cavity inside, the gravity of the ballasting tank can be changed by changing the volume of water in the water-containing cavity, so as to adjust the penetration force and the pullout force.

Finally, in this disclosure, by providing a flushing pipe communicating with the water-containing cavity, the water in the water-containing cavity is used to flush the backfill soil outside the spudcan leg, so as to prevent the backfill soil from affecting the pullout resistance analysis in the experiment, and to help increase spudcan pullout speed.

BRIEF DESCRIPTION OF DRAWINGS

The following drawings are intended only to schematically illustrate and explain this disclosure and do not limit the scope of this disclosure. Wherein.

DESCRIPTION OF EMBODIMENTS

For a clearer understanding of the technical features, objects and effects of this disclosure, specific embodiments will now be described with reference to the drawings.

Figure 1:
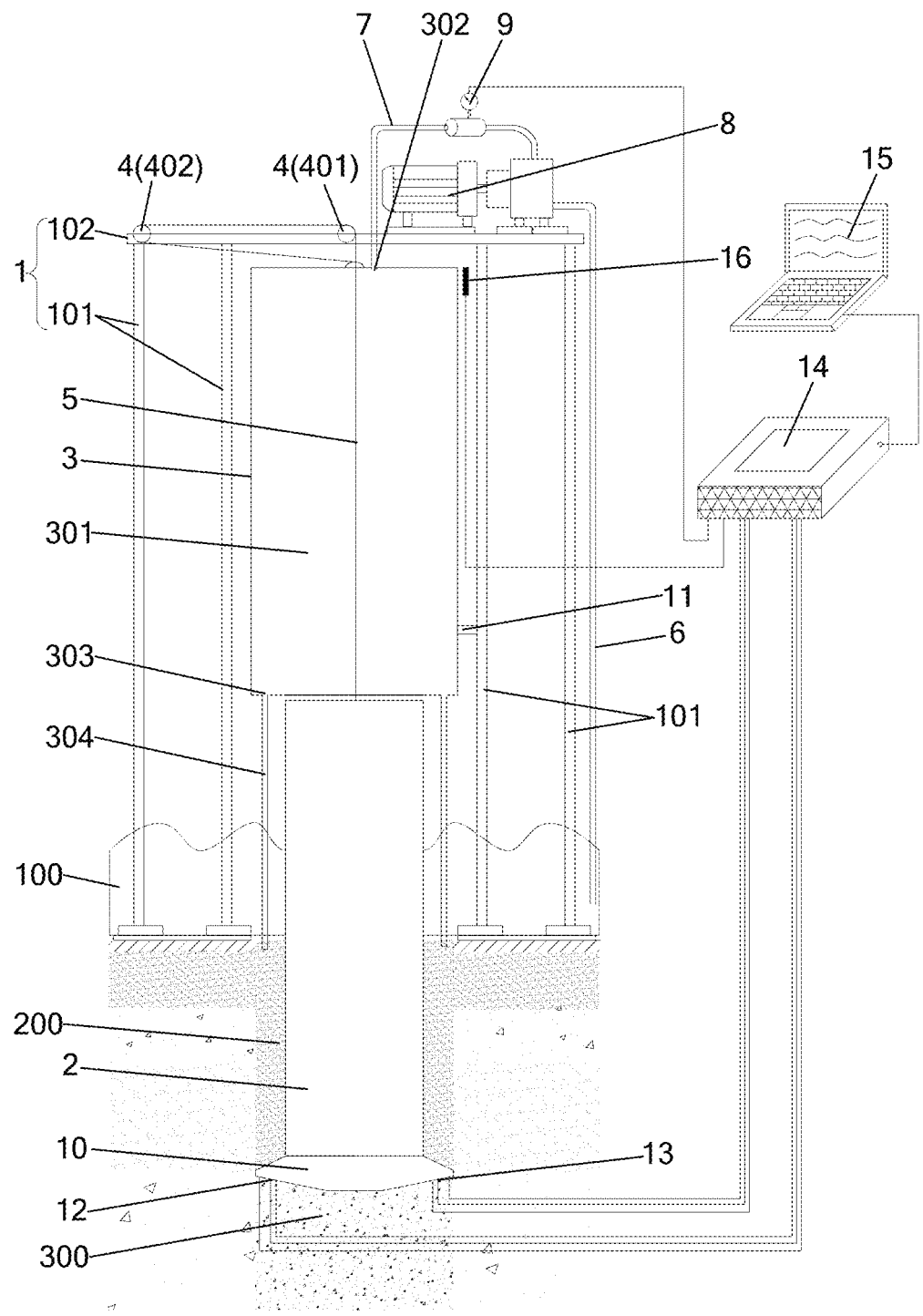
FIG. 1 is a schematic diagram of the experiment device for spudcan penetration and pullout of a jack-up rig provided by this disclosure when the ballasting tank is in the first state.
Figure 2:
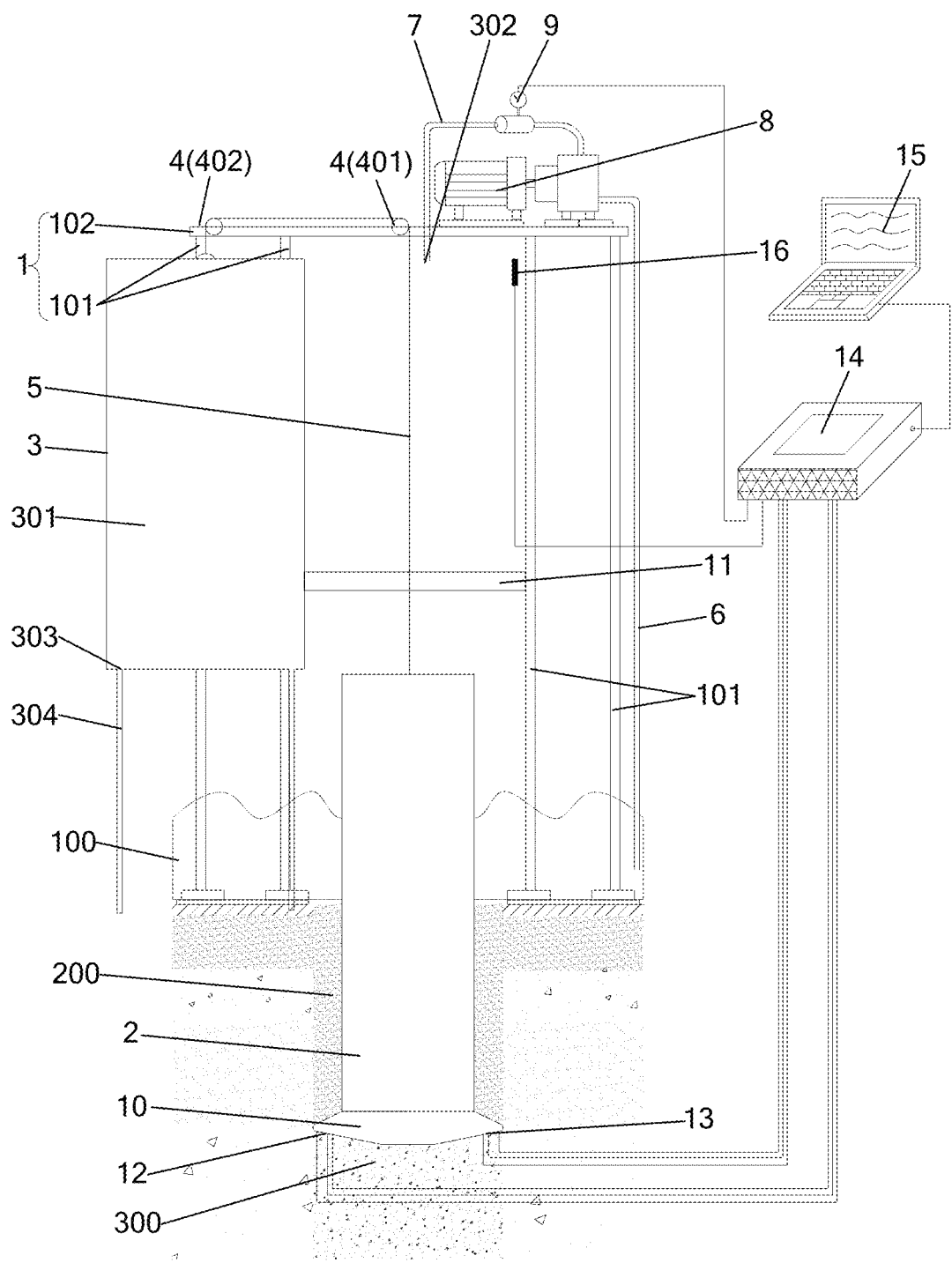
FIG. 2 is a schematic diagram of the experiment device for spudcan penetration and pullout of a jack-up rig provided by this disclosure when the ballasting tank is in the second state.
Figure 3:
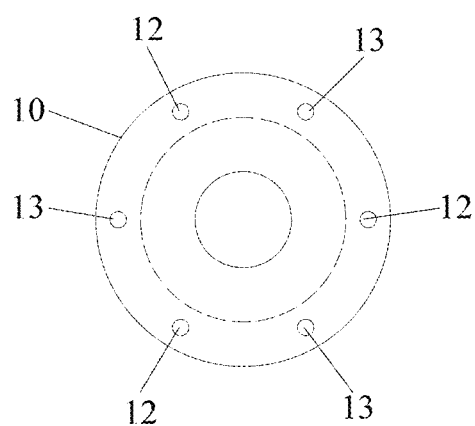
FIG. 3 is a bottom view of the spudcan shoe in FIG. 1.

As shown in FIGS. 1 and 2, this disclosure provides an experiment device for spudcan penetration and pullout of a jack-up rig, comprising an experiment bench 1 and a spudcan leg 2, and further comprising a ballasting tank 3, supporting wheels 4 and a suspension rope 5. The supporting wheels 4 are provided on the experiment bench 1, and are for example pulleys. The suspension rope 5 is wound around the supporting wheels 4, and two ends of the suspension rope 5 are connected respectively to the spudcan leg 2 and the ballasting tank 3. The ballasting tank 3 has a first state of being seated on the spudcan leg 2 (as shown in FIG. 1) and a second state of being separated from the spudcan leg 2 and suspended under the suspension rope 5 (as shown in FIG. 2). When the ballasting tank 3 is in the first state, the gravity of the ballasting tank 3 acts as an penetration force exerting on the spudcan leg 2 (as shown in FIG. 1), and when the ballasting tank 3 is in the second state, the gravity of the ballasting tank 3 acts as a pullout force exerting on the spudcan leg 2 through the suspension rope 5 (as shown in FIG. 2), so as to pull the spudcan leg 2 out of the soil body to complete the spudcan pullout operations.

In this disclosure, by configuring the ballasting tank 3 to have two different states, the gravity of the ballasting tank can be used as both the penetration force and the pullout force, and there is no need to provide two loading devices to apply the penetration force and the pullout force respectively. In this way, the structure of the experiment device is simplified, and the experiment process is made simple and the experiment operation is made convenient.

In this disclosure, the switching between the two states of the ballasting tank 3 can be realized by manually pushing the ballasting tank 3 to move by the experimenter, or by providing a drive device to drive the ballasting tank 3 to move (e.g., by driving the ballasting tank to move linearly in a horizontal direction perpendicular to a height direction of the spudcan leg).

In an embodiment, as shown in FIG. 1 and FIG. 2, the ballasting tank 3 has a water-containing cavity 301 for containing water therein. After water is injected into the water-containing cavity 301, the gravity of the ballasting tank 3 is the sum of its own gravity and that of the water. By changing the volume of the injected water, the gravity of the ballasting tank 3 can be changed, so as to adjust the penetration force and the pullout force.

There is no limitation on the shape of the ballasting tank 3. The shape of the ballasting tank 3 may be square, cylindrical or any other shape.

As shown in FIG. 1, in a specific embodiment, the ballasting tank 3 may be provided with a water injection port 302 communicating with the water-containing cavity 301. The experiment device may further comprise a first water injection pipe 6 connected to the water injection port 302, a second water injection pipe 7 connected to a water supply source, and a water pump 8 connected between the first water injection pipe 6 and the second water injection pipe 7. For example, the water supply source is simulated sea water 100 above the soil body into which the pipe leg 2 is inserted. One end of the second water injection pipe 7 is connected to a water pump 8, and the other end of the second water injection pipe 7 is inserted into the simulated sea water 100. The water pump 8 pumps a part of the simulated sea water 100 into the water-containing cavity 301 of the ballasting tank 3. In this way, water is obtainable on the spot, making the experiment operation much facilitated.

As shown in FIG. 1, the first water injection pipe 6 may be further provided with a flow meter 9 for measuring an injection flow rate of the simulated sea water 100 let into the ballasting tank 3, making it possible to calculate an accumulated water injection volume, enabling the experimenter to know the load of the ballasting tank 3 in real time from the water injection volume.

As shown in FIG. 1, in a specific embodiment, the ballasting tank 3 may be provided with a plurality of water outlets 303 communicating with the water-containing cavity 301, each of which is connected to a flushing pipe 304. A plurality of flushing pipes 304 extend respectively to below middle of the pipe leg 2, and are arranged on the outer peripheral of the pipe leg 2. For example, the water outlet 303 is provided at the bottom of the ballasting tank 3.

Specifically, as shown in FIG. 1, a spudcan shoe 10 may be connected below the pipe leg 2, and the diameter of the spudcan shoe 10 is larger than that of the pipe leg 2. Therefore, after the spudcan penetration operation is completed, an annulus is formed between the outer peripheral wall of the pipe leg 2 and the soil body, and it is inevitable that the soil body will enter into the annulus to form a backfill soil 200. In order to prevent the backfill soil 200 from increasing the spudcan pullout resistance, the flushing pipe 304 is provided in the present embodiment, for flushing away the backfill soil 200 by using the water in the ballasting tank 3, thereby preventing the backfill soil 200 from affecting the pullout resistance analysis in the experiment.

In an embodiment, as shown in FIG. 1 and FIG. 2, at least two supporting wheels 4 are horizontally arranged on the experiment bench 1, of which at least one is a first supporting wheel 401 located directly above the spudcan leg 2 and at least another one is a second supporting wheel 402 located horizontally outside the pipe leg 2. The suspension rope 5 is wound around the first supporting wheel 401 and the second supporting wheel 402, so that when the ballasting tank 3 is in the second state, the ballasting tank 3 and the pipe leg 2 are suspended below the second supporting wheel 402 and the first supporting wheel 401 by suspension rope 5, respectively.

In an embodiment, as shown in FIG. 1 and FIG. 2, the experiment device may further comprise a linear driving device 11 coupled to the ballasting tank 3. The linear driving device 11 makes the ballasting tank 3 to switch between the first state and the second state by driving the ballasting tank 3 to move linearly. Specifically, the linear driving device 11 switches the ballasting tank 3 from the first state to the second state by pushing the ballasting tank 3 seated on the pipe leg 2 to the outside of the pipe leg 2 and separating the ballasting tank 3 from the pipe leg 2. On the other hand, the linear driving device 11 switches the ballasting tank 3 from the second state to the first state by pushing the ballasting tank 3 from the outside of the spudcan leg 2 onto the spudcan leg 2 and seating the ballasting tank 3 on the spudcan leg 2.

For example, the linear driving device 11 may be a rack and pinion driving mechanism, a linear motor or a lead screw, and may be any other conventional linear driving device.

In an embodiment, as shown in FIGS. 1 and 2, the experiment device may further comprise a spudcan shoe 10 fixed to the bottom of the spudcan leg 2. An soil pressure sensor 12 and a pore water pressure sensor 13 may be mounted on the bottom surface of the spudcan leg 2. The soil pressure sensor 12 is for measuring the soil pressure between the spudcan shoe 10 and a subsea soil body 300 in the spudcan penetration and pullout process. The pore water pressure sensor 13 is for measuring the pore water pressure between the spudcan shoe 10 and the subsea soil body 300 in the spudcan penetration and pullout process.

In an embodiment, as shown in FIGS. 1 and 2, the experiment device may further comprise a data acquisition system 14 and a data processing system 15. The soil pressure sensor 12 and the pore water pressure sensor 13 are each electrically connected to the data acquisition system 14. The data acquisition system 14 is electrically connected to the data processing system 15. The data acquisition system 14 acquires soil pressure data and pore water pressure data and transmits the soil pressure data and pore water pressure data to the data processing system 15 to be stored and processed by the data processing system 15. The data processing system 15 is, for example, a computer.

As shown in FIG. 1 and FIG. 2, the data acquisition system 14 may be further electrically connected to the flow meter 9, and the data acquisition system 14 acquires the water injection flow rate data and water injection volume data measured by the flow meter 9. The water injection flow rate data and water injection volume data are transmitted to the data processing system 15, to be stored and processed by the data processing system 15. Preferably, the flow meter 9 is a digital flow meter.

As shown in FIGS. 1 and 2, the experiment device may further comprise a displacement sensor 16 for measuring a displacement of the spudcan leg 2 in the spudcan penetration process and the spudcan pullout process. The displacement sensor 16 is mounted on the spudcan leg 2, for measuring the displacement of the spudcan leg 2 in spudcan penetration and pullout process, such as the depth of spudcan penetration into the soil, and is electrically connected to the data acquisition system 14. The data acquisition system 14 acquires the displacement data of the spudcan leg 2 measured by the displacement sensor 16 and transmits the displacement data of the spudcan leg 2 to the data processing system 15 to be stored and processed by the data processing system 15.

In an embodiment, as shown in FIG. 1 and FIG. 2, the experiment bench 1 may comprise a support truss 101 and a support platform 102. The support truss 101 is fixed above the soil body into which the spudcan leg 2 is inserted (e.g., support truss is disposed in the height direction). The support platform 102 is fixed to the top of the support truss 101. The supporting wheels 4 are connected to the support platform 102. The water pump 8 is arranged on the support platform 102. The linear driving device 11 is connected to the support truss 101 (e.g., the linear driving device is disposed in the horizontal direction and connected to a side wall of the ballasting tank).

Described above is merely illustrative embodiments of the invention and is not intended to limit the scope of the invention. Any alternations and modifications made by those skilled in the art without departing from the concepts and principles of this disclosure shall fall within the scope of the invention. It should also be understood that an embodiment of the invention does not necessarily comprise all the elements described above, instead may comprise any combination of the elements according to the practical application. Therefore the invention encompasses any such combinations.

What is claimed is:

1. An experiment device for spudcan penetration and pullout of a jack-up rig, comprising an experiment bench and a spudcan leg, wherein the experiment device further comprises:
   a ballasting tank;
   supporting wheels provided on the experiment bench;
   a suspension rope which is wound around the supporting wheels, and has two ends being connected respectively to the spudcan leg and the ballasting tank, wherein the ballasting tank has a first state of being seated on the spudcan leg and a second state of being separated from the spudcan leg and suspended under the suspension rope, when the ballasting tank is in the first state, a gravity of the ballasting tank acts as a penetration pressure exerting on the spudcan leg, and when the ballasting tank is in the second state, the gravity of the ballasting tank acts as a pullout force exerting on the spudcan leg through the suspension rope; and
   a linear driving device coupled to the ballasting tank, wherein the linear driving device makes the ballasting tank switch between the first state and the second state by driving the ballasting tank to move linearly in a horizontal direction perpendicular to a height direction of the spudcan leg.

2. The experiment device according to claim 1, wherein the ballasting tank has a water-containing cavity for containing water therein.

3. The experiment device according to claim 2, wherein the ballasting tank is provided with a water injection port communicating with the water-containing cavity, the experiment device further comprises a first water injection pipe connected to the water injection port, a second water injection pipe connected to a water supply source, and a water pump connected between the first water injection pipe and the second water injection pipe.

4. The experiment device according to claim 3, wherein the first water injection pipe is provided with a flow meter.

5. The experiment device according to claim 2, wherein the ballasting tank is provided with a plurality of water outlets communicating with the water-containing cavity, each of which is connected to one of a plurality of flushing pipes, the plurality of flushing pipes extend respectively to below middle of a pipe leg, and are arranged on an outer peripheral of the pipe leg.

6. The experiment device according to claim 1, wherein at least two supporting wheels are horizontally arranged on the experiment bench, with at least one being a first supporting wheel located directly above the spudcan leg and at least one being a second supporting wheel located horizontally outside of a pipe leg, and the suspension rope is wound around the first supporting wheel and the second supporting wheel.

7. The experiment device according to claim 1, wherein the experiment device further comprises a spudcan shoe fixed to a bottom of the spudcan leg, a soil pressure sensor and a pore water pressure sensor are mounted on a bottom surface of the spudcan leg.

8. The experiment device according to claim 7, wherein the experiment device further comprises a data acquisition system and a data processing system, the soil pressure sensor and the pore water pressure sensor are each electrically connected to the data acquisition system, and the data acquisition system is electrically connected to the data processing system.

9. The experiment device according to claim 8, wherein the experiment device further comprises a displacement sensor for measuring a displacement of the spudcan leg in spudcan penetration process and spudcan pullout process, the displacement sensor is mounted on the spudcan leg and is electrically connected to the data acquisition system.

10. The experiment device according to claim 1, wherein the experiment bench comprises a support truss which is disposed in the height direction;
   the linear driving device is disposed in the horizontal direction, with one end connected to the support truss and an other end connected to a side wall of the ballasting tank.

* * * * *